Dec. 4, 1923.  1,476,454
K. R. MANVILLE
GOVERNOR CAM SHAFT BRAKE
Filed Dec. 7, 1922
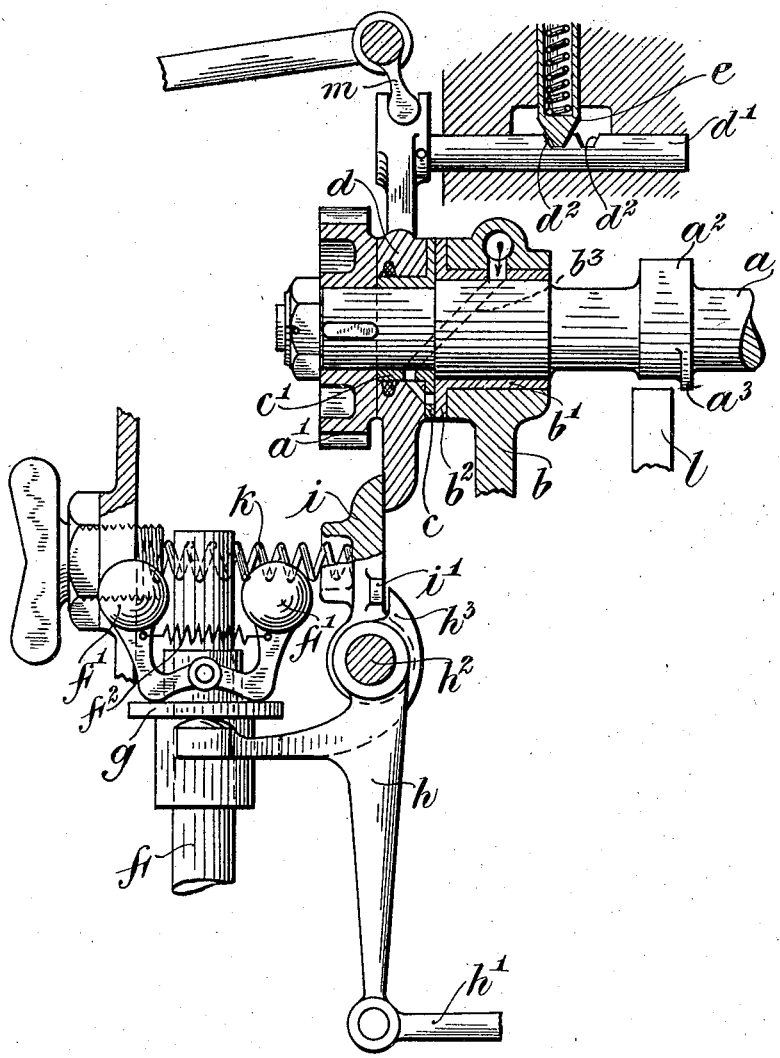
INVENTOR
Keith R. Manville
BY
Redding & Greeley
ATTORNEYS Patented Dec. 4, 1923.

1,476,454

UNITED STATES PATENT OFFICE.

KEITH R. MANVILLE, OF BROOKLYN, NEW YORK, ASSIGNOR TO INTERNATIONAL MOTOR COMPANY, OF NEW YORK, N. Y., A CORPORATION OF DELAWARE.

GOVERNOR CAM-SHAFT BRAKE.

Application filed December 7, 1922. Serial No. 605,389.

*To all whom it may concern:*

Be it known that I, KEITH R. MANVILLE, a citizen of the United States, residing in the borough of Brooklyn, of the city of New York, in the State of New York, have invented certain new and useful Improvements in Governor Cam-Shaft Brakes, of which the following is a specification, reference being had to the accompanying drawing, forming a part hereof.

During the operation of internal combustion engines at low speeds a cam shaft tends to drag and accelerate, at different speeds, depending upon whether the valve spring is resisting its movement or retarding it with the result that a slap is set up in those gears where back-lash is provided. The object of the invention is to provide a brake for the cam shaft which will co-operate therewith in such manner as to assist in maintaining constant angular speed at all times. More particularly, the invention seeks to provide a brake of this character which shall be controlled by the governor for the throttle valve so that its application will be most effective at low speeds and its release brought about at high engine speeds. A more particular object of the invention is to associate the improved devices with manually operated pressure relief devices of conventional form to the end that certain of the elements thereof may be availed of in accomplishing the desired objects. For instance, it is usual in manually operated pressure relief devices to include a spring pressed detent for maintaining the cam shaft in predetermined axial positions. This detent in the improved devices may be made of such construction as to automatically set up some braking effort on the cam shaft at all speeds. Another element of the pressure relief devices which may be availed of in the improved construction is the shifting arm for the cam shaft. In accordance with the present invention this arm may be constructed of such form and be so disposed with respect to the cam shaft as to constitute the braking element thereof.

These and other objects will appear more fully hereinafter in connection with the illustrated embodiment of the invention shown in the drawing which illustrates partly in section and partly in side elevation and in a somewhat conventional manner, suitable elements, suitably related, to accomplish the desired action.

Since the invention, in its broader aspects, is not to be limited to the combination of the improved devices with pressure relief mechanism the embodiment will be described first with reference only to a cam shaft brake and without regard to the relief mechanism with which may be associated. This phase of the invention does contemplate, however, the association with the braking element of a governor control. In the drawings a cam shaft $a$ is illustrated as journaled in a bracket $b$ and driven through a gear $a'$ keyed at one end and the shaft being shiftable longitudinally as will later appear. In the preferred construction the shaft is journaled in a bushing $b'$, which is flanged at $b^2$ to provide a braking surface of extended area for co-operation therewith of a contacting flange $c$ of a bushing $c'$ carried rotatably with the shaft $a$. Provision for lubricating the contacting surfaces of the shaft and bushings is provided by the oil duct $b^3$. When the shaft $a$ is slid longitudinally it will be evident that greater or less braking effort may be impressed thereon through the engagement of the flanges $c, b^2$. This braking effort tends to maintain the angular speed of the shaft constant at all times and particularly at low speeds where the valve spring assists in accelerating it at periods. In the preferred embodiment it is proposed to transmit braking effort to the shoe $c$ through an arm $d$ engaged therewith and carried with a slidable rod $d'$ notched at $d^2$ for engagement with a spring pressed detent $e$ tapered at its end to exert constantly a lateral thrust on the rod and set up some braking effort between the shoe $c$ and the drum $b^2$. It is proposed, at lower engine speeds to supplement this braking effort through an additional spring the pressure of which is automatically reduced through a governor at higher engine speeds. As shown, a governor mechanism is provided including a rotating shaft $f$ which may be driven operatively from the crank shaft and on which is feathered a sleeve $g$ adapted to be moved on the shaft under the influence of two governor weights $f'$ which are rotatable with the shaft $f$. A spring $f^2$ normally tends to draw the governor weights $f'$ together and centrifugal force throws them outwardly against the action of the spring $f^2$ to move the sleeve $g$ axially in a manner commonly employed. This governor may serve to control the throttle of the motor through a bell-crank $h$ and link $h'$, the bell-crank being pivoted on a shaft $h^2$. On the shaft $h^2$ is also pivoted an arm $i$ which is normally pressed against the arm $d$ by a spring $k$. The bell-crank $h$ may be extended beyond the shaft $h^2$ to form a service arm $h^3$ adapted to engage the arm $i$ when the bell-crank is rocked on the shaft and rock the arm $i$ in a counterclockwise direction. In the illustrated embodiment an ear $i'$ at one side of the arm $i$ is disposed in the path of the arm $h^3$ for engagement therewith when the bell-crank is thus rocked.

At lower engine speeds the full force of the spring $k$ is transmitted through the arm $i$ and the arm $d$ to the brake shoe $c$ to retard the angular movement of the cam shaft $a$ and thereby tend to maintain it constant. The action of the spring $k$ is in addition to the constant thrust set up by the spring pressed detent $e$ in the manner hereinbefore described. At higher engine speeds the governor weights $f'$ move outwardly and slide the sleeve $g$ so as to rock the bell-crank $h$ and through the arm $h^3$ rotate the arm $i$ against the action of the spring $k$ thereby relieving the pressure of the latter somewhat and diminish the braking action, as is desired.

A more specific object of the present invention is to associate the improved devices with the pressure relief mechanism in such manner as to use certain of the elements thereof in the combination. Pressure relief devices contemplate the association with the exhaust cams such as $a^2$ of an opposed cam section $a^3$ thereon which normally is out of line with the valve stem indicated conventionally at $l$ but adapted to be brought into operative relation to the valve stem when the shaft $a$ is slid longitudinally. Manual devices are ordinarily employed to slide the cam $a$ to bring the cam section $a^3$ into operative relation to the valve stem $l$. Such manual devices may include an arm $d$ engaged with the shaft $a$ in such manner as to permit rotation thereof but effect longitudinal movement through the journal bearing $b$. The detent $e$ may engage either one of two notches $d^2$ in the rod $d'$ to maintain the shaft $a$ in its two predetermined positions, one being with the cam section $a^3$ out of operative relation with the valve stem $l$ and the other with the cam section $a^3$ in operative relation with the valve stem $l$ to afford relief in a manner which is understood. The manually operable device for actuating the arm $d$ may include a bell-crank $m$ engaged therewith and adapted to be moved through suitable linkage.

It is believed that the scope of the invention and its particular features have been described with sufficient clearness herein but it is to be understood that latitude and matters of design and arrangements of parts is open to one skilled in the art.

What I claim is:

1. A brake for a cam shaft including a drum and a brake shoe operatively disposed to effect a braking action on the shaft, a spring to set up a braking pressure between the parts and a governor to relieve the braking pressure of the spring at higher speeds of the cam shaft.

2. A brake for cam shafts including in combination with a slidable shaft a drum in which the shaft is journaled, a shoe rotatable with the shaft and adapted to cooperate with said drum, an arm through which the shaft is moved to press the shoe against the drum, and a spring associated with the arm to set up a braking pressure.

3. A brake for cam shafts including in combination with a slidable shaft a drum in which the shaft is journaled, a shoe rotatable with the shaft and adapted to cooperate with said drum, an arm through which the shaft is moved to press the shoe against the drum, a spring associated with the arm to set up a braking pressure, and a governor to counteract the spring and reduce the braking pressure at higher speeds of the shaft.

4. In combination with a slidable cam shaft and pressure relief mechanism for shifting the shaft, a spring pressed detent to maintain the shaft in predetermined axial positions, and a cam shaft brake operative to retard the angular speed of the shaft said detent co-operating with said brake to normally maintain a braking pressure.

5. In combination with a throttle control governor for an engine and a cam shaft, a brake co-operating with the cam shaft to retard its angular speed, a spring operatively engaged with the brake to exert its greatest braking pressure at lower speeds of the cam shaft and means associated with the throttle governor to oppose the action of the spring and reduce the braking pressure at higher engine speeds.

This specification signed this 5th day of December A. D. 1922.

KEITH R. MANVILLE.